US005563476A

United States Patent [19]

Smith et al.

[11] Patent Number: 5,563,476

[45] Date of Patent: Oct. 8, 1996

[54] CATHODE RAY TUBE DISPLAY

[75] Inventors: Kenneth G. Smith, Eastleigh; John Beeteson, Romsey, both of England

[73] Assignee: International Business Machines Corporation., Armonk, N.Y.

[21] Appl. No.: 295,133

[22] Filed: Jul. 29, 1992

Related U.S. Application Data

[63] Continuation of Ser. No. 710,877, Jun. 6, 1991, abandoned.

[30] Foreign Application Priority Data

Nov. 27, 1990 [GB] United Kingdom ................ 90312872

[51] Int. Cl.[6] ............................ G09G 1/04; H01J 29/06; H01J 1/52; H04N 5/65

[52] U.S. Cl. ................................ 315/370; 315/8; 315/85; 348/820

[58] Field of Search ............................... 315/8, 370, 399, 315/85; 335/214; 348/820

[56] References Cited

U.S. PATENT DOCUMENTS

| | | | |
|---|---|---|---|
| 3,879,633 | 4/1975 | Stark, Jr. | 315/8 |
| 4,709,220 | 11/1987 | Sakane et al. | 335/214 |
| 4,853,588 | 8/1989 | Ohtsu et al. | 315/8 |
| 4,864,192 | 9/1989 | Buchwald et al. | 315/8 |
| 4,992,697 | 2/1991 | Penninga et al. | 315/8 |

*Primary Examiner*—Gregory C. Issing

*Attorney, Agent, or Firm*—Joscelyn G. Cockburn

[57] ABSTRACT

A display comprising a cathode ray display tube (1) having an electromagnetic deflection yoke (2) is described. A pair of first deflection coils (7,6) are located symmetrically about the longitudinal axis of the tube (1) on opposite sides of the yoke (2) for producing within the tube (1) a first magnetic deflection field. A pair of second deflection coils (8,20) are similarly located symmetrically about the longitudinal axis on opposite sides of the yoke (2) for producing within the tube (1) a second magnetic deflection field at right angles to the first deflection field. The display is further provided with a pair of first cancellation coils (4,3) connected to the first deflection coils (7,6) for producing a first cancellation field which tends to cancel a first stray field produced by the first deflection coils (7,6). Support means (10,11) secure the first cancellation coils symmetrically about the longitudinal axis. The display additionally comprises a pair of second cancellation coils (50,32) coupled to the second deflection coils (8,20) for producing a second cancellation field which tends to cancel a second stray field produced by the second deflection coils (8,20). Further support means (51,52) are provided for positioning the second cancellation coils (50, 32) symmetrically about the longitudinal axis in such a way that a plane containing a second cancellation coil (50) is perpendicular to any plane containing a first cancellation coil (4). Preferably, the display also comprises control means (64) for generating a predetermined cancellation current in the second cancellation coils (50,32) in response to a particular second deflection current in the second deflection coils (8,20).

2 Claims, 4 Drawing Sheets

CATHODE RAY TUBE DISPLAY

This is a continuation of patent application Ser. No. 07/710,877, filed Jun. 6, 1991, now abandoned.

The present invention relates to a Cathode Ray Tube (CRT) Display and in particular to reducing stray magnetic fields radiating from a CRT display.

A CRT for a CRT display is generally provided with an electromagnetic yoke comprising a pair of horizontal deflection coils and a pair of vertical deflection coils. Currents flowing in the deflection coils generate a pair of orthogonal magnetic deflection fields within the yoke for sweeping an electron beam across a phosphor coating applied to the inner surface of the CRT screen.

The magnetic flux of each deflection field has a return path extending from the yoke and beyond the confines of the CRT display to form a stray magnetic field. Although there is no scientific proof that these stray fields are harmful to humans, there is currently a requirement in some countries that the stray fields in the frequency range 1 kHz to 400 kHz (hereinafter referred as Very Low Frequency Magnetic Fields or VLMF) are reduced to below a particular value. The horizontal sweep frequency of a raster-scanned CRT display is in the range 10 kHz to 100 kHz. Therefore most of the VLMF field radiated from the display is produced by the horizontal deflection coil.

Manufacturers of CRT displays have directed much design effort towards meeting the VLMF requirement. The most common approach has been to use one or more cancellation coils to generate a magnetic cancellation field which tends to cancel the undesired VLMF field. In some examples of this approach, the cancellation coils are connected in series with the horizontal deflection coils to produce a cancellation field which varies in antiphase with the VLMF field. These and other examples of VLMF cancellation coils are described further in Finnish Patent application 86148, PCT application WO87/060054, European Patent Applications 220777, 235863, 349098, and 258891, U.S. Pat. No. 4,709,220, and IBM Technical Disclosure Bulletin May 1988 page 9 to 10, Vol. 30, No. 12.

Another approach has been to use a magnetic shunt located adjacent to the yoke to minimise the VLMF field. An example of this approach is described in European Patent application 203995.

Still another approach has been to use one or more short circuit loops next to the yoke. In operation, an electromotive force is generated in the loop which causes current to flow. The current flowing in the loop in turn produces a magnetic field which tends to cancel the VLMF field. An example of this approach are described in European Patent application 179298.

More recently, another requirement has been proposed that the stray fields radiating from a CRT display in the frequency range 1 Hz to 1 kHz (hereinafter referred to as Extra Low Magnetic Fields or ELMF fields) are reduced to below a particular value. Again, there is no scientific proof that ELMF fields are harmful to humans. Raster scanned CRT displays generally have a vertical sweep frequency in the range 50 Hz to 100 Hz. Therefore, most of the ELMF field radiating from the CRT display is produced in the vertical deflection coil.

There are currently two types of yoke available on CRTs in high volumes. These are known in the art as the saddle-saddle yoke and the saddle-toroid yoke. Generally, in a saddle-saddle yoke, the vertical and horizontal deflection coils are saddle shaped in form. A funnel-shaped ferrite casing encloses the coils and thereby reduces the magnitude of both the VLMF and ELMF fields. In a saddle-toroid yoke, the vertical deflection coils are semi-toroidal in form and are not generally enclosed by a ferrite casing. The ELMF field radiating from a saddle-toroid yoke can therefore be much larger than that radiating from an equivalent saddle-saddle yoke.

An aim of the present invention is to reduce the ELMF field radiating from a CRT display.

In accordance with the present invention, there is now provided a display comprising: a cathode ray display tube having an electromagnetic deflection yoke; a pair of first deflection coils located symmetrically about the longitudinal axis of the tube on opposite sides of the yoke for producing within the tube a first magnetic deflection field; a pair of second deflection coils located symmetrically about the longitudinal axis on opposite sides of the yoke for producing within the tube a second magnetic deflection field at right angles to the first deflection field; a pair of first cancellation coils electrically coupled to the first deflection coils for producing a first cancellation field which tends to cancel a first stray field produced by the first deflection coils; support means for positioning the first cancellation coils symmetrically about the longitudinal axis; wherein the display further comprises: a pair of second cancellation coils electrically coupled to the second deflection coils for producing a second cancellation field which tends to cancel a second stray field produced by the second deflection coils; and support means for positioning the second cancellation coils symmetrically about the longitudinal axis in such a way that a plane containing a second cancellation coil is perpendicular to a plane containing a first cancellation coil.

This has the advantage that ELMF fields radiating from a CRT display can now be cancelled as well as VLMF fields radiating from the display. In particular, the ELMF field radiating from a saddle-toroid or similar yoke having an unshielded vertical deflection coil can now be cancelled without incurring a significant increase in cost.

Preferably, the display further comprises control means for generating a predetermined cancellation current in the second cancellation coils in response to a particular second deflection current in the second deflection coils.

The control means can be adjusted during a manufacturing process step to optimise cancellation of ELMF fields without degrading the quality of the image display by the display.

An embodiment of the present invention will now be described by way of example with reference to the accompanying drawing in which.

Figure 1:
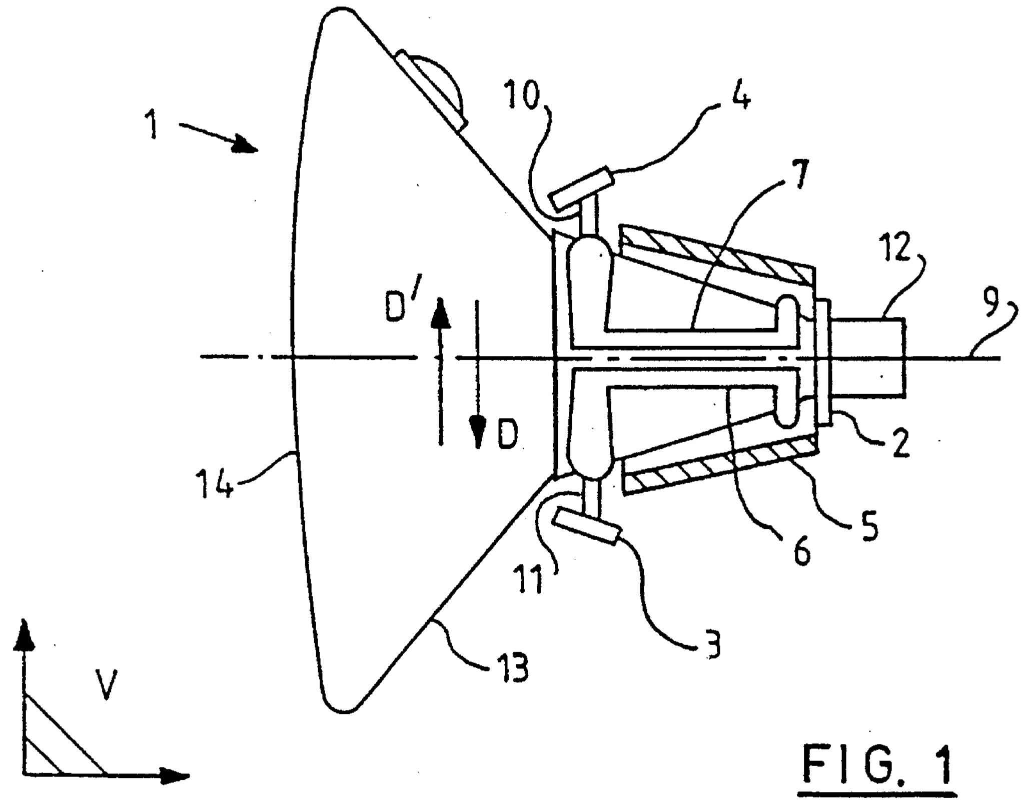
FIG. 1 is a side view of a CRT having a saddle-saddle yoke.

FIG. 1 shows a CRT 1 for a CRT display of the prior art (not shown). The CRT 1 includes a neck 12 extending from an evacuated glass bell 13 bonded to a glass screen 14. A saddle-saddle yoke 2 comprising a pair of horizontal deflection coils 7,6 and a pair of vertical deflection coils (not shown in FIG. 1) is fastened to the neck 12. The horizontal deflection coils 7,6 and vertical deflection coils 8,20 both have saddle-shaped windings enclosed by a funnel shaped casing 5 (shown cut away). The horizontal deflection coils are wound on the outer face of the yoke and the vertical deflection coils are wound on the inner face. In operation, the horizontal deflection coils 7,6 generate a magnetic deflection field for sweeping an electron beam in a horizontal direction across a phosphor coating applied to the inner surface of the CRT screen 14. The vertical deflection coils generate a vertical deflection field at right angles to the horizontal deflection field. The vertical deflection field vertically sweeps the electron beam across the phosphor coating. The horizontal and the vertical deflection fields have flux return paths extending outside the yoke and beyond the confines of the display.

Figure 2:
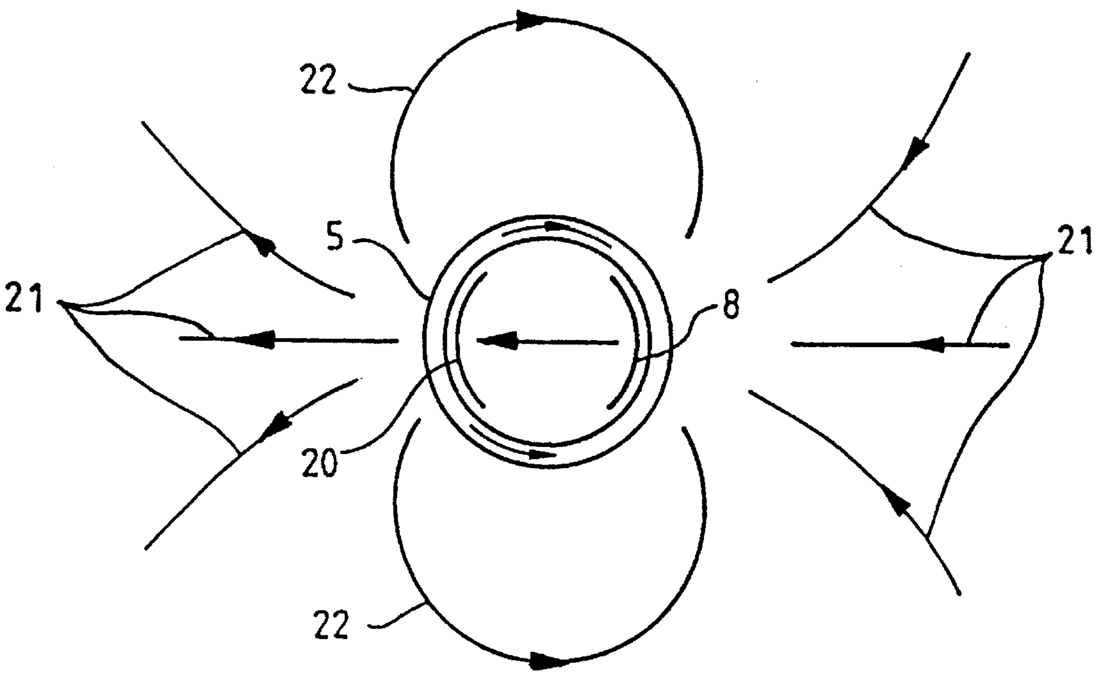
FIG. 2 is a front view of the saddle-saddle yoke illustrating the return flux direction back into yoke.

FIG. 2 illustrates the orientation of the vertical deflection field flux return paths 21,22 associated with the vertical deflection coils 8,20 of the saddle-saddle yoke 2. Paths 22 pass diagonally through the yoke. Paths 21 are longer and pass around the outside of the yoke. The longer paths 21 produce the stray fields. Specifically, the horizontal deflection coils 7,6 generate the VLMF field and vertical deflection coils 8,20 generate the ELMF field. These fields are partially contained by the ferrite casing 5.

Referring back to FIG. 1, the CRT further comprises a pair of symmetrical VLMF cancellation coils 4,3 fastened to the yoke by supports 10,11 positioned adjacent to the bell 13. Each VLMF cancellation coil 4 is thus located adjacent to a horizontal deflection coil 7. The VLMF cancellation coils 4,3 are connected in series with the horizontal deflection coils 7,6 and are orientated so that, when a deflection current flows in the deflection coils 7,6, a cancellation field is set up by the cancellation coils which is in antiphase with, and therefore tends to cancel the VLMF. The VLMF approximates to that which would be generated by a magnetic dipole D positioned with its axis vertical and intersecting the longitudinal axis of the CRT. The VLMF cancellation coils are inclined with respect to each other in such a way that they generate an equal and opposite polarity magnetic dipole D' in the position of dipole D. Each cancellation coil 4 has a surface area commensurate with the surface area of the corresponding horizontal deflection coil to optimise distribution of the cancellation field. For a typical fourteen inch colour CRT display, the combined inductance of the horizontal deflection coils 7,6 is of the order of 400 uH. Each cancellation coil typically consists of ten turns of copper wire. In practise, the additional load imposed on horizontal deflection circuitry by the VLMF cancellation coils 4,3 connected in series with the horizontal deflection coils 7,6 is negligible in comparison with the load imposed by the horizontal deflection coils 7,6 alone.

Figure 3:
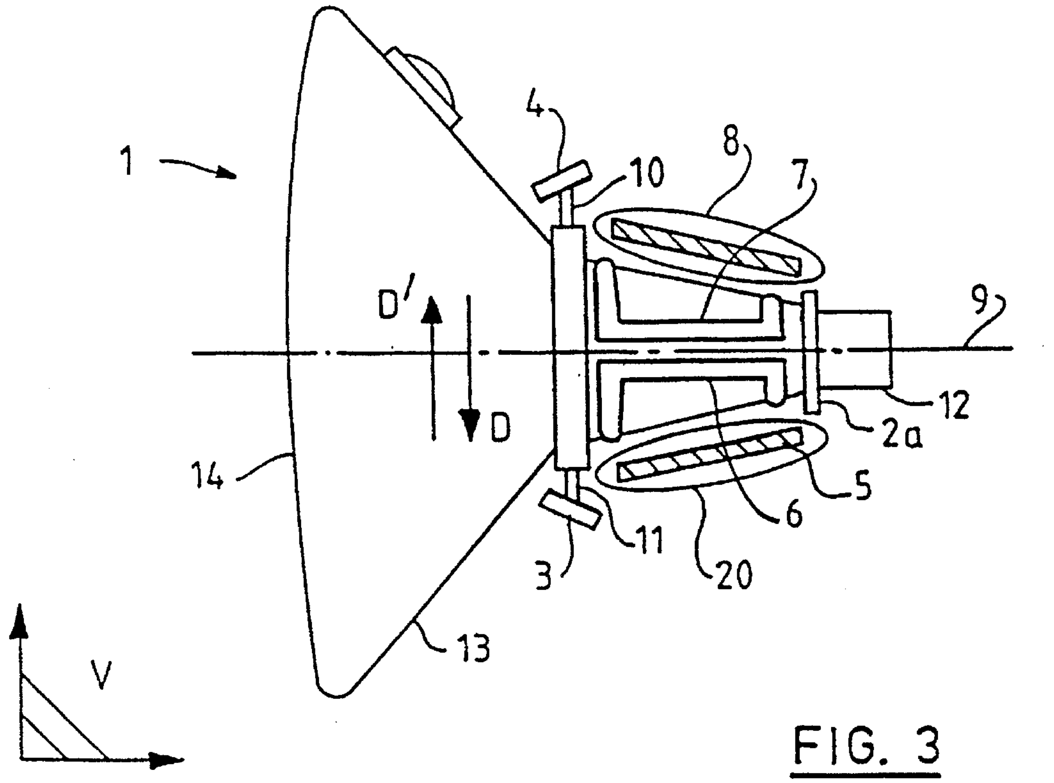
FIG. 3 is a side view of a CRT having a saddle-toroid yoke for a display of the present invention.

FIG. 3 shows a CRT provided with a saddle-toroid yoke 2*a* comprising a pair of saddle shaped horizontal deflection coils 7,6 and a pair of semi-toroidal vertical deflection coils 8,20. The vertical deflection coils are wound onto the casing 5. The yoke 2*a* is also provided with VLMF cancellation coils 4,3 connected in series with the horizontal deflection coils 7,6 for cancelling the VLMF field.

Figure 4:
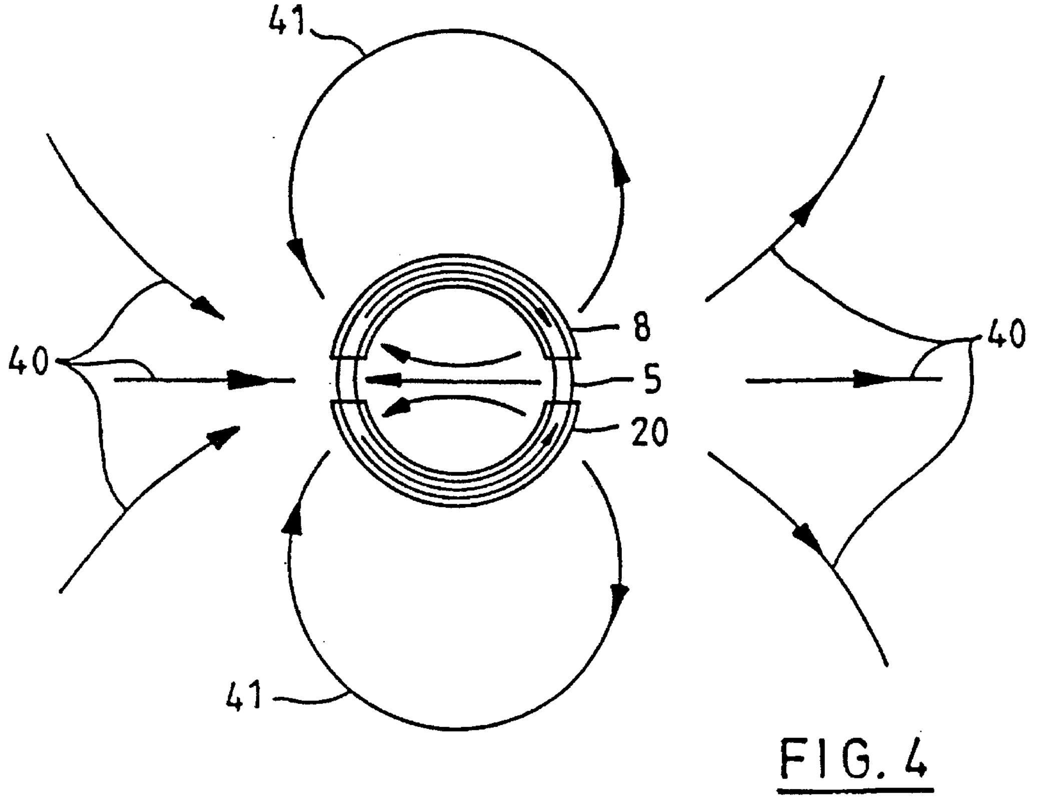
FIG. 4 is a front view of the saddle-toroid yoke illustrating the return flux direction back into the yoke.

FIG. 4 illustrates the orientation of the vertical deflection field flux return paths 40,41 associated with the saddle-toroid yoke 2*a*. The return paths 40,41 are similar to the return paths 20,21 associated with the saddle-saddle yoke 2 illustrated in FIG. 2. The horizontal deflection coils 7,6 are enclosed by the ferrite casing 5. However, the toroidal vertical deflection coils 8,20 are in part external to the casing. The ELMF field extending from the yoke 2*a* is much greater than that from an equivalent saddle-saddle yoke 2. Typically, the ELMF field from a saddle-saddle yoke 2 is four times smaller than that from a saddle-toroid yoke 2*a*.

The ELMF field strength can be reduced by enclosing the deflection coils 7,6,8,20 and in particular the semi toroidal coils 8,20 beneath a cylindrical or frustoconical shield of a material of high magnetic permeability such as mu metal. In operation, the shield reduces the change in ELMF strength as the electron is scanned across the screen and the rate of change of ELMF field strength. However, such materials are relatively expensive in comparison with coils of copper wire.

Figure 5:
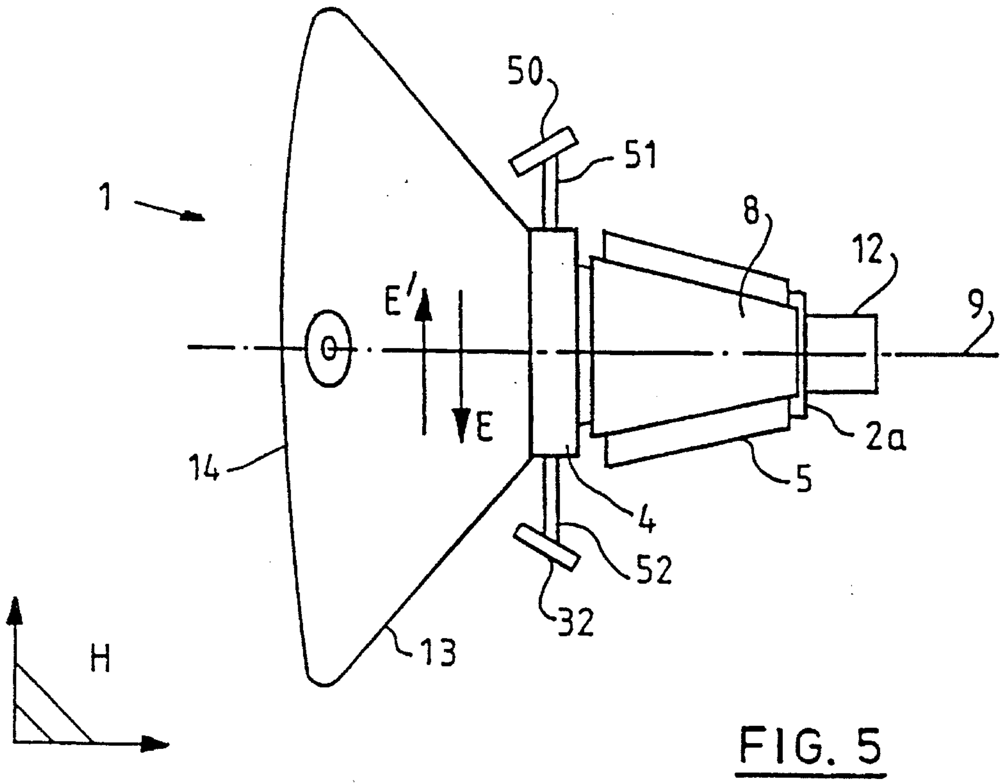
FIG. 5 is a plan view of the CRT having the saddle-toroid yoke for the display of the present invention.

Referring now to FIG. 5, the ELMF approximates to that which would be produced by a magnetic dipole E located with its axis horizontal and intersecting the longitudinal axis of the CRT 1. In theory, the ELMF field could be eliminated by placing a single ELMF cancellation coil in the position of dipole E and applying a current through the coil to generate an equal and opposite dipole E'. However, in practise the glass bell 13 prevents placement of such a coil.

Referring back to FIG. 3 in addition to FIG. 5, in a CRT display of the present invention, the CRT 1 is provided a pair of symmetrical ELMF cancellation coils 50,32 fastened to supports 51,52 positioned on either side of the yoke 2*a*. In preferred embodiments of the present invention, the ELMF cancellation coils 50,32 are contained in planes which are inclined with respect to each other and intersect with the vertical plane along a line located on that side of the yoke adjacent to the bell 13. The ELMF coils 50,32 in combination generate a magnetic dipole E' in the same position as, and of opposite polarity to the theoretical dipole E. Each ELMF cancellation coil 50 has an area commensurate with a corresponding lobe of the ELMF field to be cancelled.

Figure 6:
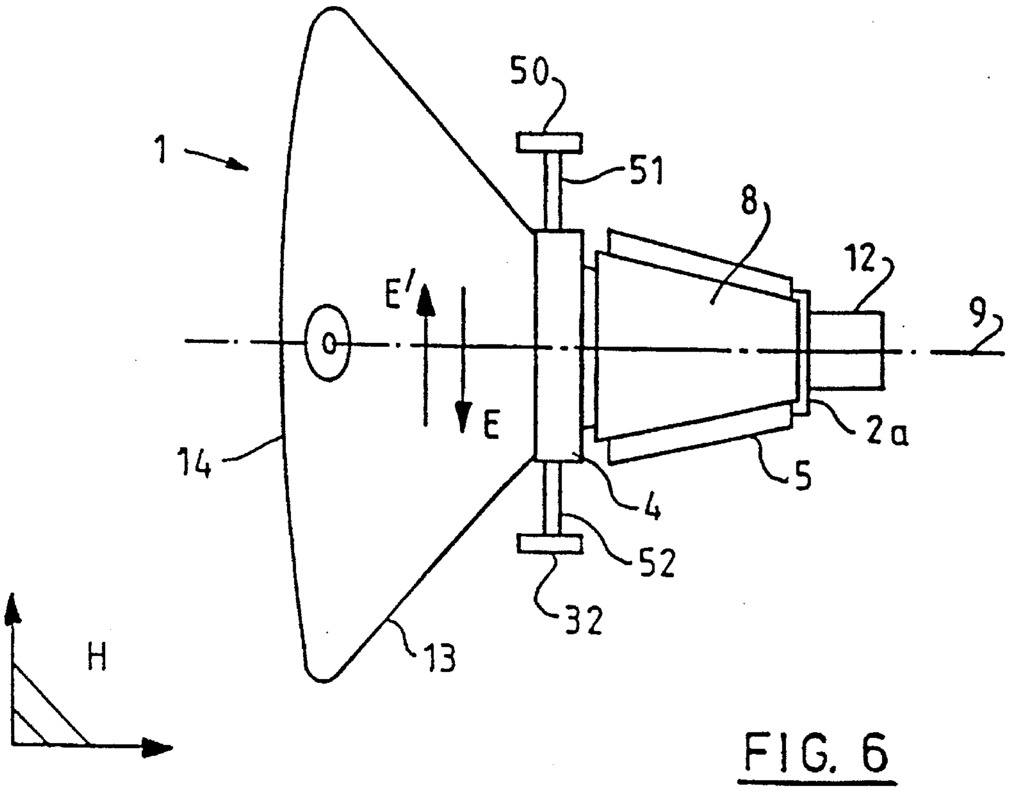
FIG. 6 is a plan view of another CRT having a saddle-toroid yoke for the display of the present invention.

FIG. 6 shows an example of a CRT for a CRT display of the present invention in which the the ELMF cancellation coils 50,32 are symmetrically positioned on either side of the yoke 2*a* but in parallel with a vertical plane V containing the longitudinal axis of the CRT 1 rather than inclined to each other.

Each ELMF coil 50 of a CRT display of the present invention can comprise a short circuit loop of wire. In operation, the ELMF field generates an electromotive force (EMF) having a magnitude proportional to the magnetic field strength. The EMF drives a current around in each loop which generates an ELMF cancellation field in antiphase with the ELMF field. The current flowing in each of the two loops is determined by the corresponding loop impedance. In operation, the loops reduce the rate of change of ELMF field strength. However, the loops do not significantly reduce the change in ELMF field as the electron beam is scanned across the screen. Furthermore, such coils can cause noticeable output image degradation.

In theory, a more desirable effect could be achieved by connecting the ELMF coils 50,32 directly in series with the vertical deflection coils 8,20 so that, when a vertical deflection current flows, a cancellation field is set up which would tend to cancel the ELMF field. However, the inductance of the vertical deflection coils 8,20 in combination for a typical fourteen inch colour CRT is approximately 40 mH. Therefore, each ELMF coil 50 would require approximately 400 turns to create a cancellation field equivalent to that generated by the VLMF cancellation coils. Accordingly, the load imposed on corresponding vertical scan deflection circuitry by the cancellation coils 50,32 connected in series with the vertical deflection coils 8,20 would be significant in comparison with that of the vertical deflection coils 8,20 alone. The output picture quality would therefore become noticeably impaired.

Figure 7:
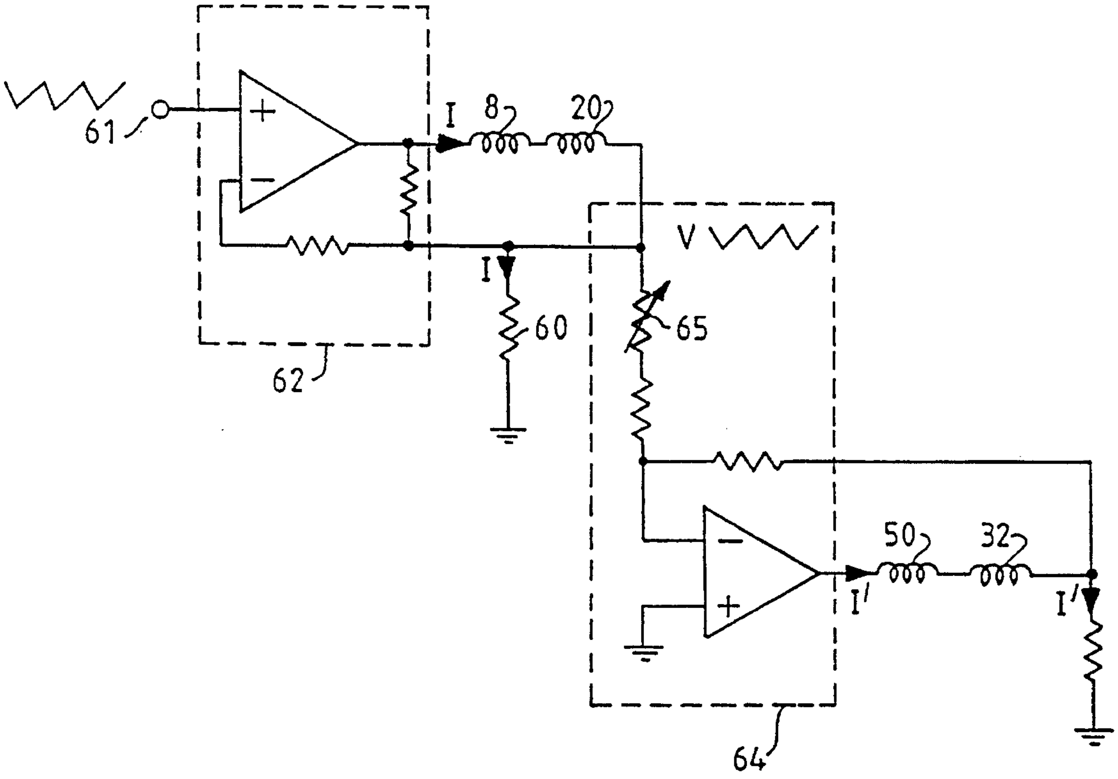
FIG. 7 is a circuit diagram of a vertical deflection circuit for the display of the present invention.

FIG. 7 shows a vertical deflection circuit for a CRT display of the present invention. A sawtooth voltage signal 61 is translated into a vertical deflection current I by a power amplifier 62 having an output connected to the vertical deflection coils 8,20. A sense resistor 60 is connected in series with vertical deflection coils 8,20 to provide the vertical deflection current I with a path to ground. A sense voltage signal V proportional to the vertical deflection current I is generated across the sense resistor 60. A cancellation current I' proportional to the sense voltage signal V is generated by a transconductance amplifier 64 having an output connected to the cancellation coils 50,32. The cancellation current I' flowing through the cancellation coils 50 and 32 therefore varies as a function of the vertical deflection current I. Cancellation of the ELMF field radiating from the vertical deflection coils 8,20 can thus be achieved without affecting the output response of the vertical deflection circuit. In preferred examples of the present invention, the amplifier 64 has a variable gain control 65 which can be set during a step in the manufacture of the display step to provide a desired level of ELMF cancellation when the display is in operation.

An example of the present invention has now been described with reference to a CRT having a saddle-toroid yoke. It will however be appreciated that in other examples of the present invention the CRT may comprise a saddle-saddle yoke.

In the example of the CRT display of the present invention hereinbefore described, the transconductance amplifier provides a high impedance buffer between the vertical deflection coils and the ELMF cancellation coils. It will be appreciated however, that in a CRT display with particularly sensitive horizontal scan drive circuitry, a similar transconductance amplifier could provide a high impedance buffer between the VLMF cancellation coils and the horizontal deflection coils to prevent the cancellation coils from loading the deflection system.

We claim:

1. A display comprising:

a cathode ray display tube (1) having an electromagnetic deflection yoke (2);

a pair of first deflection coils (7, 6) located symmetrically about the longitudinal axis of the tube (1) on opposite sides of the yoke (2) for producing within the tube (1) a first magnetic deflection field;

a pair of second deflection coils (8, 20) located symmetrically about the longitudinal axis on opposite sides of the yoke (2) for producing within the tube (1) a second magnetic deflection field at right angles to the first deflection field;

a pair of first cancellation coils (4, 3) electrically coupled to the first deflection coils (7, 6) for producing a first cancellation field which tends to cancel a first stray field produced by the first deflection coils (7, 6);

support means (10, 11) for positioning the first cancellation coils (4, 3) symmetrically about the longitudinal axis;

a pair of second cancellation coils (50, 32) electrically coupled to the second deflection coils (8, 20) for producing a second cancellation field which tends to cancel a second stray field produced by the second deflection coils (8, 20);

support means (51, 52) for positioning the second cancellation coils (50, 32) symmetrically about the longitudinal axis in such a way that a plane containing a second cancellation coil (50) is perpendicular to a plane containing a first cancellation coil (4);

a first control means (64) interconnecting the pair of second deflection coils (8, 20) and the pair of second cancellation coils (50, 32), said first control means including a transconductance amplifier for generating a predetermined cancellation current in the pair of second cancellation coils (50, 32) in response to a predetermined deflection current in the pair of second deflection coils (8, 20) and a variable gain control circuit for adjusting the gain of the transconductance amplifier.

2. The display of claim 1 wherein the variable gain control circuit includes a variable resistor; said variable resistor adaptable to be set to a resistance value to provide a desired level of cancellation current when the display is in operation.

* * * * *